(12) United States Patent
Moran

(10) Patent No.: US 8,082,879 B2
(45) Date of Patent: Dec. 27, 2011

(54) METHOD FOR INCUBATION AND HATCHING OF EGGS

(75) Inventor: Leonard Moran, Mayo (IE)

(73) Assignee: Ovagen International Limited, Carrentrila (IE)

( * ) Notice: Subject to any disclaimer, the term of this patent is extended or adjusted under 35 U.S.C. 154(b) by 546 days.

(21) Appl. No.: 12/279,596

(22) PCT Filed: Feb. 22, 2007

(86) PCT No.: PCT/EP2007/051736
§ 371 (c)(1),
(2), (4) Date: Nov. 17, 2008

(87) PCT Pub. No.: WO2007/096417
PCT Pub. Date: Aug. 30, 2007

(65) Prior Publication Data
US 2009/0301400 A1    Dec. 10, 2009

(30) Foreign Application Priority Data

Feb. 23, 2006  (WO) ................. PCT/EP2006/060242

(51) Int. Cl.
*A01K 45/00* (2006.01)
(52) U.S. Cl. ....................................................... 119/6.8
(58) Field of Classification Search ................... 119/6.8
See application file for complete search history.

(56) References Cited

U.S. PATENT DOCUMENTS

| | | | | |
|---|---|---|---|---|
| 4,512,285 | A | * | 4/1985 | McGehee ..................... 119/300 |
| 5,983,830 | A | * | 11/1999 | Cox et al. ..................... 119/6.8 |
| 6,718,909 | B2 | * | 4/2004 | Moran ........................... 119/6.8 |
| 2006/0201429 | A1 | * | 9/2006 | Moran ........................... 119/6.8 |
| 2009/0099575 | A1 | * | 4/2009 | Moran ........................... 606/119 |
| 2009/0165723 | A1 | * | 7/2009 | Moran ........................... 119/6.8 |
| 2009/0301400 | A1 | * | 12/2009 | Moran ........................... 119/300 |

FOREIGN PATENT DOCUMENTS

| | | |
|---|---|---|
| DE | 195 35 073 | 2/1997 |
| EP | 0511431 A2 | 11/1992 |
| EP | 1297745 A1 | 4/2003 |
| EP | 1297745 A1 * | 4/2003 |
| WO | 92/06591 | 4/1992 |
| WO | 98/00151 | 1/1998 |
| WO | 01/02000 A2 | 1/2001 |

OTHER PUBLICATIONS

Lundy, H. (1969), "A Review of the Effects of Temperature, Humidity, Turning and Gaseous Environment in the Incubator on the Hatchability of the Hen's Egg, Fertility and Hatchability of the Hen's Egg", pp. 143-176.*
Lundy, H. (1969), "A Review of the Effects of Temperature, Humidity, Turning and Gaseous Environment in the Incubator on the Hatchability of the Hen's Egg," Fertility and Hatchability of the Hen's Egg, pp. 143-176.
Robertson, I.S. (1961), "Studies on the Effect of Humidity on the Hatchability of Hens' Eggs, I. The Determination of Optimum Humidity for Incubation," Journal of Agricultural Science, 57:185-194.
Robertson, I.S. (1961), "Studies on the Effect of Humidity on the Hatchability of Hen's Eggs, II. A Comparison of Hatchability, Weight Loss and Embryonic Growth in Eggs Incubated at 40 and 70% R.H.," Journal of Agricultural Science, 57:195-198.
International Search Report mailed Dec. 2, 2008 for International Patent Application No. PCT/EP2007/051736 (5 pgs.).
Written Opinion of the International Searching Authority for International Patent Application No. PCT/EP2007/051736 (7 pgs.).

* cited by examiner

*Primary Examiner* — Frank T Palo
(74) *Attorney, Agent, or Firm* — K&L Gates LLP

(57) ABSTRACT

The present invention is directed to a method for the incubation and hatching of premature eggs, in particular, surgically-derived premature eggs removed from a bird prior to transfer of the premature egg to the cloaca of a bird.

14 Claims, No Drawings

METHOD FOR INCUBATION AND HATCHING OF EGGS

CROSS REFERENCE TO RELATED APPLICATIONS

This application is the U.S. National Phase Application of International Patent Application Serial No. PCT/EP2007/051736, filed Feb. 22, 2007, published under PCT Article 21(2) in English, which claims priority to and the benefit under 35 U.S.C. Section 365 of International Patent Application Serial No. PCT/EP2006/060242, filed Feb. 23, 2006, the entire disclosures of each of which are incorporated by reference herein.

FIELD OF THE INVENTION

This invention is directed to a method for the incubation and hatching of premature eggs, in particular premature eggs removed in their shell from a bird prior to transfer of the premature egg to the cloaca of a bird.

BACKGROUND TO THE INVENTION

European Patent application no. 01650109, is directed to a method for rearing a bird of germ-free status comprising housing a parent bird, removing a premature egg in its shell from the parent bird prior to transfer of the premature egg to the cloaca and incubating the premature egg in its shell and hatching the premature egg to produce a laying bird.

Ventilation, temperature control and humidity are very important during the incubation and hatching process. The eggshell, in particular its pores and cuticle, modulate respiratory gas exchange and hydration of the developing embryo. Essentially, the eggshell is a breathable membrane and whilst the embryo is developing the eggshell allows carbon dioxide and water to escape from the egg and oxygen to enter the egg. As the embryo grows, it requires an increased supply of oxygen. Furthermore, care must be taken to maintain the appropriate humidity levels during the hatching period.

The conditions required for successful incubation and hatching of a normal, naturally laid egg are well known. These conditions vary between species. For example, for domestic fowl such as chickens, the entire process takes from 20 to 22 days, generally 21 days, with incubation conditions applying from Day 0 to Day 18 and hatching conditions applying from Day 18 to 21. During incubation eggs should be positioned so that the domed end, which contains the air cell, is uppermost. Typical incubator conditions are air temperature of 37.5° C., relative humidity (RH) of 50%, and regular turning (rocking) of the eggs so that the longitudinal axis of the eggs is slowly rotated through approximately 80° (40° each side of vertical) once every 45 to 180 minutes.

At 3 days prior to hatching, on or after Day 18, the embryos typically move into the hatching position within the egg. The eggs should no longer be turned at this stage. From Day 19 to 21 the relative humidity should be raised to approximately 60% to 70%. This high humidity level reduces moisture loss from the egg. It is also important to maintain adequate ventilation throughout the incubation and hatching stages to ensure that carbon dioxide and oxygen concentrations of normal air at standard atmospheric pressure (760 mmHg) are maintained.

Normally, during the incubation of an egg and prior to the hatching phase, by Day 18 or 19, the eggs loose approximately 13% of their initial weight. This weight loss is essential for the correct development of an egg.

European Patent no. 0 295 964 describes an in-vitro avian embryo culture technique. In particular, this specification is directed to the incubation of an embryo in a closed container after the embryo has been removed from its shell. The container used is preferably part of an egg shell which has been chosen from the same species as is being cultured or, in the terms of the present invention, from a similar hen. Similarly, European Patent no. 0 511 431 discloses an in-vitro culture method for a fertilised ovum of a hen in which an embryo which has just been fertilised is taken from an upper portion of the magnum of the oviduct of a hen within an hour or so after oviposition and then subsequently cultured. Both of these specifications merely disclose the artificial culturing of eggs which have been removed without their shell.

The present invention is directed to special techniques for the incubation and hatching of surgically-derived premature eggs in their shell, in particular those derived from the method of European Patent application no. 01650109. These techniques give improved results in terms of yield of surgically-derived eggs when compared to conventional egg incubation and hatching techniques.

STATEMENT OF THE INVENTION

According to a general aspect of the invention, there is provided a method for incubating and hatching of a premature egg in its shell in a sterile environment comprising the steps of optionally cooling and pre-incubation storage of the egg; placing the premature egg in an incubation isolator adapted to provide variable rocking of the eggs; monitoring ventilation and weight loss of the eggs; during the incubation phase decreasing the relative humidity (RH) in the isolator to a level of from approximately 15% to 40%; during the hatching phase increasing the relative humidity to a level of from approximately 60 to 75% and stopping the rocking of the eggs; and maintaining the eggs in the isolator until hatching.

Unexpectedly, the desired relative humidity in the first 18 days of the incubation phase is much lower than required for normal eggs. If this low relative humidity of 15-40% was used for hatching normal/conventional eggs (i.e. eggs permitted to mature fully in the reproductive tract and laid naturally through the cloaca) it would give very low hatchability rates (<40%) whereas for premature eggs, this low relative humidity is the optimal RH range. Thus, using such low relative humidity levels in the incubation phase goes against the conventional teachings in this field.

According to a first aspect of the invention, there is provided a method for incubating and hatching surgically-derived premature eggs in their shell in a sterile environment comprising the following steps:
  a. Pre-incubation storage of the surgically-derived premature egg;
  b. Placing the eggs in an incubation isolator adapted to provide variable rocking of the eggs;
  c. Controlling the ventilation in the isolator;
  d. Weighing the eggs to monitor weight loss;
  e. During the incubation phase decreasing the relative humidity to approximately 15% to 40% and altering the temperature in the incubation isolator to obtain a target weight loss during the incubation phase;
  f. During the hatching phase controlling the relative humidity and temperature in the incubating isolator and increasing the relative humidity to approximately 60% to 75% and stopping the rocking of the eggs; and
  g. Maintaining the eggs in germ-free conditions in the isolator until hatching.

According to this invention, the germ-free status of the surgically-derived egg is maintained throughout the method.

DETAILED DESCRIPTION OF THE INVENTION

The present invention is directed to incubation and hatching methods for a surgically-derived premature egg from optional pre-incubation storage through to incubation and hatching of a viable bird.

Surgically-derived eggs (such as those obtained using the procedures of European Patent application no. 01650109), by their nature, are premature. In some cases their development, for example gastrulation, may be delayed. Furthermore, it is possible that premature eggs may lack certain features of a full-term naturally laid egg, for example there may be reduced cuticle on the shell and pore formation in the shell may be impaired. It has been found that some surgically-derived eggs, due to premature egg shell formation and effects of surgical anaesthesia, euthanasia methods and timing, may not adequately loose moisture and corresponding body weight which are essential for correct embryo development and chick viability. Therefore, standard hatchery practices for normal laid eggs are not be appropriate to achieve optimum viability of the premature surgically-derived eggs.

According to one embodiment of the invention, there is provided a method for incubating and hatching surgically-derived premature eggs in their shell comprising the following steps:
a. Pre-incubation storage of the surgically-derived premature egg;
b. Placing the eggs in an incubation isolator adapted to provide variable rocking of the eggs;
c. Controlling the ventilation in the isolator;
d. Weighing the eggs to monitor weight loss;
e. During the incubation phase decreasing the relative humidity to approximately 15% to 40% and altering the temperature in the incubation isolator to obtain a target weight loss during the incubation phase;
f. During the hatching phase controlling the relative humidity and temperature in the incubating isolator and increasing the relative humidity to approximately 60 to 75% and stopping the rocking of the eggs; and
g. Maintaining the eggs in germ-free conditions in the isolator until hatching.

We have unexpectedly discovered that conventional hatchery techniques are not appropriate for surgically-derived premature eggs. A new method is required specifically for premature eggs to achieve a consistently high hatch rate of healthy birds from such surgically-derived eggs.

Specifically, we have surprisingly discovered that incubating surgically-derived eggs at low humidity levels at defined times gives better results in terms of viable embryos. Unexpectedly, in the first approx. 18 days of incubation, use of RH (approx 50% RH) suitable for naturally laid eggs gave very low egg hatchability (<35% viable hatched) for premature eggs, whereas it provided >85% viable hatched for naturally laid eggs. Furthermore and again unexpectedly, use of low RH (15-40%) in the first approx 18 days of incubation, which for naturally laid eggs gave very low hatchability (<40%) gave unexpectedly good hatchability for premature eggs (>70% viable hatched). Retaining these low humidity levels is advantageous as it provides for the required weight loss to ensure viable hatching of a bird.

Ideally, the surgically-derived premature egg in its shell is germ-free and the method of the invention is carried out in a sterile atmosphere to ensure germ-free conditions during hatching and incubation.

According to a preferred embodiment of the invention, the ventilation within the incubator is controlled. Ventilation using a combination of HEPA filtered air and sterile air supplemented with sterile oxygen when appropriate may be used.

According to another embodiment of the invention, the isolator is provided with facilities to weigh the eggs. This enables direct monitoring of egg weight loss. A target weight loss from the start of incubation to prior to the hatching period for an individual egg is from approximately 10 to 15% of the initial egg weight.

According a still preferred embodiment of the invention, the isolator may be provided with one or more incubators, such that each incubator may simultaneously provide different conditions, specifically relative humidity levels, necessary to optimise weight loss and viability for individual eggs. Separate incubators are used in the situation where wide variations in egg weight loss are anticipated.

The incubation period is defined as the time period from Day 0 to Day 18 in the incubator. Rocking of the eggs in this time period is essential. Day 0 corresponds to the first day the egg is placed in an incubator. The hatching period is defined as the time period from Day 19 to Day 21. Rocking of the eggs is not required during this time period.

Relative humidity at normal levels during incubation and hatching is understood to be from approximately 50% to 70%. The present method recognises the need to alter conventional incubation and hatchery practices to levels that would not be contemplated in this field. The unique characteristics of surgically derived eggs provides specific circumstances where conventional teachings in this field do not achieve the desired hatchability/viability rates.

According to a preferred embodiment of the invention, relative humidity levels are lowered to from 15 to 35%, preferably, from 25 to 35% during the incubation phase.

Additionally, the incubation phase occurs at a temperature of from 36 to 38° C.

According to a yet preferred embodiment of the invention, relative humidity levels are raised to from 60 to 75%, preferably approximately 65% during the hatching phase. Additionally, the hatching phase may occur at a temperature of from 36 to 37.5° C. The hatching phase (step (e)) may commence on or around Day 18.

It was found that whilst premature eggs, when compared with naturally laid eggs, require very much lower RH during incubation for the first 18 days, for the next 3 days in the hatching phase, the required RH is similar to that for naturally laid eggs.

The method of the invention is carried out in an incubation isolator. The incubator may be a conventional incubator used in standard hatchery techniques or it may be an incubator adapted to conform to the sterility requirements for incubating and hatching a germ-free egg i.e. an incubation isolator. Ideally, the incubation method and incubation isolator maintains the sterility and germ-free status of the premature egg.

The incubation isolator maybe provided with facilities to monitor and control ventilation rate, to dehumidify air and to achieve oxygen-enriched air (21-23% at 760 mmHg). Thus, ideally a conventional incubation isolator is used which has been modified and enabled to control ventilation is used. The method may further comprise the step of adding oxygen to the incubation isolator. Most preferably, oxygen is added when the humidity in the incubator is decreased.

Preferably, the surgically derived eggs are removed from a surgical isolator where surgical removal took place and delivered to the incubation isolator within a short time, for example within 30 minutes from surgery. It is advantageous to ensure that eggs are ventilated with air prior to commencement of incubation.

The incubation method may also include the additional initial step of cooling the eggs after surgical removal from the parent bird. It may also include a pre-incubation storage step where the eggs may then be stored, undisturbed for, at least 24 hours, preferably not more than 72 hours. In general, pre-incubation storage may be from 0 to 72 hours. Preferable, storage conditions for the premature egg are: HEPA filtered air, temperature between 15° C. and 23° C., relative humidity of 50% to 75% and storage free from vibration or sudden jarring.

According to another embodiment of the invention, the eggs may be incubated using sterile equipment and specified contamination or germ-free air.

According to a further specific embodiment of the invention the method comprises the following steps: For the first 24 hours standard incubation conditions for the species of egg may be used. Thereafter, each egg should be carefully monitored for weight loss, incubation temperature, relative humidity and, if appropriate respiratory gaseous exchange especially carbon dioxide and oxygen concentrations in air. The incubation and hatching conditions can be adjusted according to the invention. Ideally, for 55 g surgically-derived premature egg a target weight loss of from approximately 0.4 g/day is desirable. Incubation temperatures of approximately 37.2-37.6° C. are preferable initially on Day 0 until Day 18 of incubation and then temperatures of approximately 36.5-37.5° C. are desirable until hatching. Relative humidity may initially be set at approximately 40% but should be adjusted daily according to ventilation rate and daily egg weight loss until Day 18 when relative humidity should be increased to approximately 65%.

According to a still further embodiment of the invention, the surgical procedure for removal of the premature egg from the uterus of the bird includes incision through the skin of the bird and manipulation of the uterus. It is important that the egg is not contaminated with waste material from the gut of the bird and the egg itself is not damaged during the technique. The egg may be removed from the bird either in the intact, sealed (e.g. clamped-off) uterus or directly by incision of the uterus. All direct contact between fluid forms of sterilising solutions should be avoided to counteract any risk of impairment of embryo viability. Aseptic techniques are essential.

Alternatively, the surgical removal comprises:—
Performing a laparotomy incision and tying off the oviduct of the bird at both ends with sutures;
Transecting the oviduct distal to each suture;
Removing the egg enclosed in the oviduct;
Sterilising the oviduct;
Removing the egg; and
Sterilising the egg.

Preferably, the bird is anesthetized but may alternatively be sacrificed by euthanasia or killing prior to removal of the egg in its shell. Female parent birds may be either live or recently killed. Live birds may, as consistent with ethical, legal and animal welfare considerations, be fully conscious, sedated or anaesthetised. Eggs and ova may be either fertilised or unfertilised.

Preferably, the removal of the egg is at a time prior and as close as possible to the transfer time when the egg would transfer naturally to the cloaca in the parent bird.

The surgically removed egg may then be placed in a sterile container and sealed. The container should allow the egg to cool and be of suitable design and size to for egg storage. A sterile container is one with an approximate volume 10 times that of the egg, with the egg supported and protected by a plastic frame to ensure both stability and ventilation.

Once the eggs have hatched, a suitable environment for hatched chicks, rearing birds, laying and reproductively active birds is a rigid walled isolator, with HEPA-filtered air. The air is maintained at positive pressure and exchanged at frequent intervals (e.g. 10 times per hour for adult birds, taking into account cubic capacity of the isolator and stocking density). The floor area is ideally from 0.2-0.4 $m^2$ per bird. Gloves on entry ports are protected from damage by birds. Air temperature and lighting controlled to provide conditions similar to those for conventional birds of the same species and stage of life-cycle.

According to a further embodiment of the invention, once the surgically-derived egg has hatched, rearing and breeding the derived bird in a healthy and productive state is maintained in a specified contamination free or sterile environment. Adjustments to nutrient contents of diets may be required.

Specifically, organic micronutrients such as fat or water-soluble vitamins may be added to compensate for losses occurring during sterilization of the diets and from an absence of supply from commensal micro-organisms. Diets sterilised by gamma radiation have reduced concentrations of fat-soluble and water soluble vitamins. Furthermore, gamma irradiated diets have a limited shelf life and should be monitored for fat rancidity.

Analysis of the dietary contents then allows calculation of the required appropriate supplementation for the birds according to stage of life-cycle. Dependent on the particular nutrient, these may be administered parenterally or orally either in feed or in water. Drinking water should also be gamma irradiated (UV irradiated water may contain bacterial spores).

According to a still further embodiment of the invention, there is provided a method for rearing and breeding the surgically derived eggs comprising administering antibiotics to the surgically derived premature eggs in ova. Preferably, orally administered fluroquinolones are administered and, as appropriate, to the specific micro-organisms to be eliminated, other antimicrobial agents. The antibiotics eliminate transovarian bacterial and mycoplasmal infections and have a positive effect on viability and sterility of embryos and subsequent chicks. Antivirals, pharmaceuticals, small molecules, peptides and monoclonal antibodies may also be used to eliminate or prevent viral infections.

It will be appreciated that the specific conditions required to incubate and hatch an egg vary with, for example, the species and stage of development when removed from the parent bird.

While in the above, the description has related entirely to poultry and specifically hens, it will be appreciated that the present invention may be carried out on other birds.

If fertile eggs are used to produce offspring or derived birds, then the eggs may be hatched, reared, maintained and bred in either conventional husbandry systems, germ-free systems or in isolators to control the entry of micro-organisms.

According to the invention, for maximum freedom from micro-organisms eggs should preferably be derived aseptically from parent females (unless they are also germ-free) and the life-cycle should be completed in isolators. The life-cycle may be completed outside isolators when germ-free eggs and birds are produced.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention will be illustrated by the following non-limiting examples.

Example 1

Material and Methods

Premature eggs in their shell were obtained from a parent bird according to the techniques of European Patent application no. 01650109.

The premature eggs were cooled after surgical removal from the parent bird. They were then stored, undisturbed for, at least 24 hours but not more than 72 hours. Storage conditions were HEPA filtered air, a temperature between 15 and 23° C., relative humidity of 50 to 75% and the eggs were stored free from vibration or sudden jarring.

The eggs were incubated using sterile equipment and specified contamination free air.

Initially for the first 24 hours standard incubation conditions were used but thereafter each egg was carefully monitored for weight loss, incubation temperature, relative humidity and, if appropriate respiratory gaseous exchange especially carbon dioxide and oxygen concentrations in air. The incubation and hatching conditions were adjusted accordingly. For example, to reduce the carbon dioxide concentrations the ventilation rate of the incubator isolator was increased and, in conditions of high ambient temperature and relative humidity, the isolator incoming air was dehumidified to ensure that relative humidity was maintained at approximately 25%.

The humidity of the isolator was decreased from 40% on Day 1 to 20 to 25% to increase moisture loss through the egg shell. This encouraged weight loss of the premature egg. The humidity was kept at this level up till Day 13 and was then increased to 40% from Days 14 to 18 to obtain 13% weight loss overall from Day 0 to Day 18. After Day 18 the humidity was increased to a normal hatching level of 65%.

Once the egg hatched, the following conditions were applied. A suitable environment for hatched chicks, rearing birds, laying and reproductively active birds is a rigid walled isolator, with HEPA-filtered air. The air is maintained at positive pressure and exchanged at frequent intervals (e.g. 10 times/h for adult birds, taking into account cubic capacity of the isolator and stocking density), floor area of 0.2-0.4 m$^2$/bird, gloves on entry ports protected from damage by birds, and air temperature and lighting controlled to provide conditions similar to those for conventional birds of the same species and stage of life-cycle.
Results:
Effects of pre-incubation storage time (0 to 5 days) and conditions, (temperature, humidity, egg orientation, ventilation, vibration), incubations conditions (temperature, humidity, ventilation, orientation, weight loss), handling and hatching conditions on embryo viability
Storage Times of:
  0 days—hatchability was 90%
  1-3 days—hatchability was 90%
  4-5 days—hatchability was 60%
Temperature, Ventilation/Vibration for Storage of 3 Days:
  Approx. 25° C. with vibration/ventilation—hatchability was 60%.
  Approx. 20° C. no vibration/ventilation—hatchability was 80%

Egg Orientation and Weight Loss:
  Eggs flat on side—weight loss 7.8%, hatchability 30%
  Eggs domed-end upper-most—weight loss 10.2-13.1%, hatchability 80-90%
These results establish the absence of adverse effects on hatchability of surgically derived eggs by storage of for up to three days provided that vibration is removed and ventilation provided. These results also confirm the importance of egg orientation during incubation.

Example 2

Effects of antibiotics (e.g. orally administered fluroquinolones) on elimination of transovarian bacterial and mycoplasmal infections and on viability and sterility of embryos and subsequent chicks.
Results:
  Without antibiotics—viability 22-60% and sterility 66-100%;
  With antibiotics—viability 13-57%, and sterility 89-100%.
These results establish the benefit of using antibiotics to remove transovarian infection (eg Salmonella) and the absence of adverse effects on viability of surgically derived eggs.

Example 3

Maintenance of health and reproductive efficiency using micronutrient-supplemented diets (including, vitamins A, C, E and K, B vitamin complex)
Results:
  For commercial diets irradiated with 25 rads, vitamin losses where highest (approx 50%) for vitamins A and B6. Health maintained by diets with additional supplementation. Establishes that birds hatched from surgically-derived eggs can be maintained for full life-cycle and produce eggs of normal viability.

Example 4

Effects of conventional (50%) RH levels compared with very low (25%) RH levels in the incubation period (approx 18 days) on hatchability of surgically-derived, shelled eggs.
  Initial weight of eggs approximately 60 g.
Results:
  50% RH Egg weight loss during incubation 5-9%, hatchability 33%
  25% RH Egg weight loss during incubation 8-13%, hatchability 73%
These results confirm improved hatchability when controlling weight loss/moisture loss by lower RH.

Example 5

Effects of anaesthesia or euthanasia on hatch rates of surgically derived egg.
Effects of euthanasia and removal of egg after 30 minutes compared with anaesthesia for 30 minutes and effects of 8 hour storage compared with 32 hour pre-incubation storage.
Results:
  Euthanasia: Hatchability was 25% (eggs stored for 32 hours)
  Anaesthesia: Hatchability was 75% (eggs stored for 32 hours)
  Hatchability was 0% (eggs stored for 8 hours)

Anaesthesia was provided using mixtures of oxygen and isoflurane.

Example 6

Materials and Methods

Fifty adult female and five adult male chickens of known SPF status were maintained on selected diets and allowed to breed naturally. A combination of timing and palpation was used to determine the optimal time for egg removal from the birds abdomen.

For the procedure, birds were euthanized by cervical dislocation and immediately prepared. Feathers were removed from the ventral thorax and abdomen and the exposed skin sterilised using a 50% solution of iodine in alcohol. Each bird was then placed under a specially adapted surgical isolator sterilised with a 5% solution of peracetic acid and containing sterile instruments. The bird was covered with a sterile adhesive drape and a sterile entry port of the isolator was then placed over the drape. A laparotomy incision was made and following careful dissection the egg was removed from the uterus/distal aspect of the reproductive tract and proximal to the cloaca. The egg was then transferred under germ-free conditions to an isolator adapted as a hatchery incubator.

Forty-one eggs were successfully recovered, 15-22 minutes after euthanasia, and were considered suitable for incubation.

After storage for approximately 24 h, at 18-20° C. in a vibration-free, ventilated plastic egg tray, the eggs were weighed and then 40 of the eggs were randomly allocated to one of four small rocking incubators. Two incubators were maintained at a RH of between approx 16 and 29% (nominated 25% RH) and two incubators were maintained at a RH of approx 43 and 54% (nominated 50% RH). Eggs were held air cell uppermost and were weighted individually on days 0, day 7 and 18 of the incubation. On day 18, all incubators where adjusted to provide a RH of approx 55-71%. Numbers of eggs that pipped and of live viable chicks were recorded.

Within one day of hatching, live chickens were removed from the hatchery isolator and transferred to two large-scale rearing isolators suitable for rearing groups of young chickens. Chickens were reared on supplemented commercial diets sterilised by radiation. At 18 days of age, five chickens were removed from each of the rearing isolators, euthanized and sampled for bacteriology by aerobic and anaerobic culture. Samples included liver, spleen, heart blood, vagina/cloaca, caecal and small intestinal digesta and faeces.

In addition, 100 eggs laid naturally by the 50 females selected for surgery, were incubated under standard hatchery conditions (days 0 to 18, approx 50% RH; days 18-21, 65% RH) to provide a control. All eggs were incubated at 37.4° C.

Results:

Viable chickens were hatched successfully from the artificially derived premature eggs. No anaerobic or aerobic bacteria were isolated from the chickens sampled.

Eggs laid naturally had a viable chick hatchability of 91%. This confirms a normal or high level of natural fertility in the eggs produced by the females.

There was a significantly greater hatchability of premature eggs (surgically-derived) incubated for the first 18 days at 25% RH compared with similar eggs incubated at 50% RH (73% versus 33% viable chick hatchability, respectively) ($P<0.05$).

Conclusion

A safe and highly effective method for artificial production of germ-free fertile eggs in chickens was established. Eggs were viable and produced viable germ-free chickens which were successfully maintained in isolators. However to achieve viable chick hatch rates approaching those of naturally laid eggs requires the use of abnormally low relative humidity. Specifically if conventional RH (50%) is used then hatch rates were <35% of eggs compared with >90% for naturally laid eggs and with >70% for premature, surgically-derived eggs. This is contrary to well documented results for conventional eggs where RH less than 40% is associated with decreased hatchability and is in contrast to the increased hatchability found for premature eggs incubated at 25% compared with 50% RH.

Infectious organisms that may be controlled by the invention include organisms that can be pathogenic or non-pathogenic to the relevant species. These include avian species (typically chickens, fowls and turkeys), humans and other mammals (typically dogs, cats, horses, cattle, pigs, sheep, goats, rats and mice). For the purposes of the invention, micro-organisms include parasites, bacteria (including anaerobic and aerobic species, commensal species and species associated with the gut), mycoplasma, viruses (including retroviruses), prions, fungi, yeasts, moulds and DNA and RNA fragments.

According to the present invention, the aseptic derivation of eggs and, if appropriate hatching, rearing, maintenance and breeding of birds may be used in combination with another method of controlling microbial contamination. Such methods include disinfectants, antimicrobials, antibiotics, antiviral agents, antiparasitics, immunomodulators and vaccines.

It will be appreciated that according to the invention, essentially these are artificially or surgically derived eggs which, strictly speaking, in accordance with the present invention means that the egg is removed from the parent bird prior to the transfer of the egg to an area of potential contamination. Ideally, one raises the bird as a parent bird in a sterile environment, feeding the bird with sterile food. Then, the egg is removed from the parent bird artificially prior to the transfer of the egg to an area of potential contamination in the parent bird and then the egg is incubated and hatched to produce a laying bird which is kept in this sterile environment.

It will be appreciated that the invention is not limited to the embodiment and methods described above, but may be varied within the scope of the claims.

The invention claimed is:

1. A method for incubating and improved hatching of surgically-derived premature eggs in their shell in a sterile environment comprising the following steps:
   a. Pre-incubation storage of the surgically-derived premature eggs;
   b. Placing the eggs in an incubation isolator adapted to provide variable rocking of the eggs;
   c. Controlling the ventilation in the isolator;
   d. Weighing the eggs to monitor weight loss;
   e. During the incubation phase decreasing the relative humidity to approximately 15% to 40% and altering the temperature in the incubation isolator to obtain a target weight loss during the incubation phase;
   f. During the hatching phase controlling the relative humidity and temperature in the incubating isolator and increasing the relative humidity to approximately 60% to 75% and stopping the rocking of the eggs; and
   g. Maintaining the eggs in germ-free conditions in the isolator until hatching.

2. The method according to claim 1 wherein the premature eggs are surgically-derived from a bird, preferably a chicken.

3. The method according to claim 1 wherein the isolator is provided with one or more incubators, such that each incubator simultaneously provides different relative humidity levels.

4. The method of claim 1 wherein step (a) takes place for 0 to 72 hours, preferably for at least about 24 to not more than about 72 hours.

5. The method according to claim 1 wherein the incubation period is from day 0 to day 18 after incubation starts.

6. The method according to claim 1 wherein the target weight loss for an egg during the incubation period and prior to the hatching period is from approximately 8% to 15% of the initial egg weight.

7. The method according to claim 1 further comprising adding oxygen to the isolator.

8. The method according to claim 1 wherein the humidity is increased to from 60% to 70% in step (f).

9. The method according to claim 1 wherein step (e) occurs at a temperature from 36 to 38° C.

10. The method according to claim 1 wherein step (f) occurs at a temperature from 36 to 37.5° C.

11. The method according to claim 1 wherein incubation and hatching of the premature eggs occurs in sterile equipment and specified contamination free air.

12. The method according to claim 1 wherein antimicrobials are administered in ova to the surgically derived premature eggs.

13. The method of claim 12 wherein the supplements are chosen from fat or water-soluble vitamins.

14. The method according to claim 1 including the steps of:
(h) hatching birds from the eggs; and
(i) providing the hatched birds with extra nutritional supplements in their diet.

* * * * *